United States Patent [19]

Tazuma et al.

[11] 3,867,472

[45] Feb. 18, 1975

[54] DEHYDROGENATION PROCESS

[75] Inventors: James J. Tazuma, Stow; Mario D. Zadra, Barberton, both of Ohio

[73] Assignee: The Goodyear Tire & Rubber Company, Akron, Ohio

[22] Filed: July 2, 1973

[21] Appl. No.: 376,092

[52] U.S. Cl. .............................. 260/680 R, 252/441
[51] Int. Cl. .............................................. C07c 5/18
[58] Field of Search...... 260/680 D, 680 R; 252/441

[56] References Cited
UNITED STATES PATENTS

| | | | |
|---|---|---|---|
| 3,207,807 | 9/1965 | Bajars et al. | 260/680 |
| 3,211,800 | 10/1965 | Bajars | 260/680 |
| 3,278,626 | 10/1966 | Bajars | 260/680 |
| 3,308,184 | 3/1967 | Bajars | 260/680 |
| 3,308,185 | 3/1967 | Bajars | 260/680 |
| 3,308,195 | 3/1967 | Bajars | 260/680 |
| 3,522,325 | 7/1970 | Aristoff et al. | 260/680 |
| 3,748,281 | 7/1973 | Aoki et al. | 252/441 |

*Primary Examiner*—Paul M. Coughlan, Jr.
*Attorney, Agent, or Firm*—F. W. Brunner; J. Y. Clowney; R. A. Thompson

[57] ABSTRACT

There is disclosed a method for the dehydrogenation of monoolefins to diolefins utilizing certain silver salts, cadmium salts and copper ferricyanide.

8 Claims, No Drawings

DEHYDROGENATION PROCESS

This invention relates to a process for the dehydrogenation of hydrocarbons. More specifically, it relates to a process for the dehydrogenation of monoolefins to diolefins.

There are many known prior art methods for the catalytic dehydrogenation of hydrocarbons. There are many theories put forth as to why certain materials can or cannot function as active hydrocarbon dehydrogenation catalysts.

It is generally accepted that transition metals, due to their orbital configuration, are relatively inactive for reactions involving hydrogen. The metals tend to adsorb the hydrogen, thus rendering themselves inactive rather than just removing the hydrogen and then releasing the hydrogen as gas.

It has now been discovered that certain transition metals will function as olefin dehydrogenation catalysts as shown by the invention.

Accordingly, then, the invention is a method for the dehydrogenation of monoolefins which comprises contacting said monoolefins with a catalyst consisting of at least one salt selected from the group of silver halides, cadmium halides and copper ferricyanide, supported on alumina.

The catalysts of this invention are silver halide salts representative of which are silver chloride, silver bromide and silver iodide and cadmium halide salts representative of which are cadmium bromide, cadmium chloride and cadmium iodide; and copper ferricyanide.

The monoolefinic compounds which can be dehydrogenated according to the practice of this invention may be either straight or branched chain monoolefins. The monoolefins can contain from 4 to 8 carbon atoms. Typically, any monoolefin containing from 4 to 8 carbon atoms may be dehydrogenated, but more specifically, the process produces butadiene from butenes, piperylenes from pentenes, ethyl butadiene from ethyl butenes, isoprene from methyl butenes and dimethyl butadiene from dimethyl pentenes. Some representative examples are olefins such as cis-2-butene, 1-butene, 1-pentene, 2-methyl-1-butene, cis-2-pentene, 2-methyl-2-butene, 2,3-dimethyl-2-butene, 2-ethyl-1-butene, 2-ethyl-2-butene and the like.

The following is a typical preparation of one of the catalysts used in the present invention:

The following is the preparation of a silver halide salt on an alumina support. By the term "catalyst" is meant the total weight of the silver halide salt and the alumina support. The catalyst can contain from about 1 percent to about 40 percent by weight of silver halide salt. A more preferred range of silver halide salt by weight of the catalyst is from about 10 percent to about 40 percent. The catalyst is prepared by impregnating the alumina support with an appropriate amount of a solution of silver nitrate. The excess liquid is decanted and a saturated solution of a sodium halide salt is added which reacts with the silver nitrate to produce the silver halide salt corresponding to the sodium halide salt which is used. The silver halide is dried at an elevated temperature, after which time it is ready for use.

The cadmium salts and copper ferricyanide are prepared in similar manner.

The temperature range at which the dehydrogenation process of this invention may be conducted can range from about 375°C. to about 725°C. A more preferred range of temperature is from about 450°C. to about 600°C.

The reactions are usually carried out at ambient atmospheric conditions, but this is not to say that higher or lower pressures cannot be utilized. If one desires, higher pressures could be utilized within the scope and spirit of this invention.

The dehydrogenation reaction is conducted by passing the monoolefin feed stock simultaneously with steam as a diluent or heat transfer medium over the catalyst bed to effect the dehydrogenation. The steam/monoolefin molar ratio can range from about 1 to about 40 during the dehydrogenation reaction. A more preferred range of steam/monoolefin molar ratio is from about 10 to about 25.

The rate at which the olefin is passed over the catalyst bed may be varied over a wide range. The liquid volumes of monoolefin which are passed over a given volume of catalyst per hour at 0°C. and one atmosphere is called the liquid hourly space velocity (LHSV). The LHSV may be varied over a range of about 0.1 to about 10.0. A more preferred range for the LHSV is from about 0.5 to about 2.0.

Other diluents which can be utilized besides steam are nitrogen, argon or any gas or liquid which vaporizes at the reaction temperature and is inert in that it does not adversely affect the dehydrogenation reaction. It should be understood that the dehydrogenation reaction utilized in this invention can be conducted effectively without any diluent by one skilled in the art.

The practice of this invention is further illustrated by the following examples which are intended to be representative rather than restrictive of the scope of this invention.

PREPARATION OF CADMIUM BROMIDE ($CdBr_2$) CATALYST

A 28 percent by weight water solution of cadmium bromide ($CdBr_2$) was made by reacting Cadmium Oxide (CdO) with hydrogen bromide (50 percent) in stoichiometric amounts. The cadmium bromide solution was added to 48.6 grams (gms) of one-eighth inch alumina pellets and soaked overnight. The excess liquid was decanted from the solid material and the solids dried for 24 hours at 120°C. The catalyst contained 16.0 percent by weight of cadmium bromide.

The dried catalyst was added to a 10 milliliter tubular steel reactor. The reactor and two preheating coils are set in an electrically heated boiler set at 402°C. filled with a fluidizable heat transfer media. When water is used as a diluent, it is fed to a generator and then goes to a preheating coil and then to a mixing "tee." The 3-methyl-2-pentene is metered and sent to a preheater and then mixed at the mixing tee with the preheated water. Both the preheated water (steam) and hydrocarbon are passed simultaneously over the catalyst in the reactor, resulting in the dehydrogenation products and the steam diluent. The water was separated by a cooled water trap and the hydrocarbon reaction products are collected in a dry ice-cooled trap and analyzed by gas chromatography and mass spectrometry.

Example I shows the products formed using cadmium bromide as well as other salts utilized in this invention.

EXAMPLE I

DEHYDROGENATION OF 3-METHYL-2-PENTENE STEAM DILUENT (LHSV OF OLEFIN 0.5-1)

| Run | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Catalyst | CdCl$_2$ | | | CdBr$_2$ | | | Cu$_3$[Fe(CN)$_6$]$_2$ | | AgBr | | AgCl | | AgI | |
| % Additive[1] | 19.2 | 19.2 | 19.2 | 16.0 | 16.0 | 16.0 | 12.0 | 12.0 | 17.6 | 17.6 | 14.6 | 14.6 | 20.9 | 20.9 |
| Temperature °C. | 467 | 598 | 644 | 402 | 463 | 608 | 402 | 409 | 408 | 506 | 404 | 502 | 463 | 555 |
| Conversion % | 43 | 63 | 84 | 29 | 60 | 65 | 19 | 23 | 8 | 25 | 9 | 15 | 15 | 29 |
| Selectivity % to: | | | | | | | | | | | | | | |
| C$_5$ & less | 2 | 12 | 37 | 1 | 3 | 13 | 1 | 3 | 1 | 1 | 1 | 1 | 1 | 2 |
| Isoprene | 17 | 4 | 28 | 19 | 22 | 4 | 6 | 5 | 3 | 3 | 2 | 3 | 3 | 3 |
| Piperylene | 0 | 2 | 2 | 0 | 0 | 2 | 0 | 0 | 0 | 0 | 0 | 0 | 0 | 0 |
| C$_6$ olefin* | 70 | 23 | 7 | 78 | 69 | 28 | 76 | 68 | 78 | 58 | 66 | 65 | 69 | 42 |
| C$_6$ diene | 11 | 48 | 25 | 2 | 6 | 46 | 14 | 22 | 18 | 38 | 19 | 30 | 27 | 53 |
| Higher | 0 | 10 | 1 | 0 | 0 | 7 | 3 | 1 | 0 | 0 | 0 | 0 | 0 | 0 |

*Other than feed material
[1]% Additive means the amount of salt (weight %) on the alumina support.

EXAMPLE II

DEHYDROGENATION OF CIS-2-BUTENE STEAM DILUENT (LHSV OF OLEFIN = 0.6)

| Run | Additive | % Additive | °C. Temp. | % Conv. | C$_3$ + less | % Selectivity | | |
|---|---|---|---|---|---|---|---|---|
| | | | | | | Methyl Butene | 1,3 Butadiene | Piperylene |
| 1 | AgBr | 38.6 | 511 | 3 | 4 | — | 96 | — |
| 2 | AgBr | 38.6 | 512 | 2 | 9 | — | 91 | — |
| 3 | AgCl | 27.0 | 523 | 2 | 13 | 13 | 74 | — |
| 4 | AgI | 31.6 | 522 | 4 | 32 | 3 | 64 | — |
| 5 | AgBr | 38.6 | 538 | 5 | 38 | — | 62 | — |
| 6 | AgCl | 27.0 | 552 | 3 | 7 | 13 | 67 | 13 |
| 7 | AgI | 31.6 | 550 | 11 | 40 | — | 60 | — |
| 8 | AgBr | 38.6 | 614 | 8 | 24 | — | 76 | — |
| 9 | AgCl | 27.0 | 608 | 11 | 15 | 5 | 77 | 3 |
| 10 | AgI | 31.6 | 607 | 19 | 15 | 1 | 82 | 2 |
| 11 | AgI | 31.6 | 611 | 18 | 26 | 6 | 68 | — |
| 12 | AgBr | 38.6 | 624 | 21 | 13 | — | 87 | — |

EXAMPLE III

DEHYDROGENATION OF CIS-2-BUTENE - NO DILUENT (LHSV OF OLEFIN = 1-1.5)

| Run | Additive | % Additive | °C. Temp. | % Conv. | C$_3$ + less | % Selectivity | | | Residue |
|---|---|---|---|---|---|---|---|---|---|
| | | | | | | Methyl Butene | 1,3 Butadiene | Piperylene | |
| 1 | AgBr | 38.6 | 529 | 6 | 49 | — | 50 | — | 1 |
| 2 | AgBr | 38.6 | 533 | 10 | 63 | — | 37 | — | 1 |
| 3 | AgI | 31.6 | 524 | 24 | 89 | — | 11 | — | 0 |
| 4 | AgI | 31.6 | 553 | 13 | 59 | 9 | 31 | — | 1 |
| 5 | AgBr | 38.6 | 571 | 2 | 26 | — | 74 | — | 1 |
| 6 | AgI | 31.6 | 605 | 22 | 62 | 1 | 33 | 3 | 1 |
| 7 | AgBr | 38.6 | 616 | 24 | 74 | — | 26 | — | 1 |
| 8 | AgBr | 38.6 | 624 | 20 | 50 | 8 | 29 | 3 | 10 |
| 9 | AgCl | 27.0 | 617 | 23 | 42 | 1 | 56 | — | 1 |
| 10 | AgI | 31.6 | 619 | 19 | 43 | 2 | 46 | 1 | 10 |
| 11 | AgI | 31.6 | 622 | 18 | 54 | 1 | 43 | 2 | — |

EXAMPLE IV

DEHYDROGENATION OF CIS-2-PENTENE - STEAM DILUENT (LHSV OF OLEFIN = .6)

| Run | Additive | % Additive | °C. Temp. | % Conv. | C4 + less | Methyl Butene | Isoprene | Piperylene | Residue |
|---|---|---|---|---|---|---|---|---|---|
| 1 | AgCl | 27.0 | 528 | 6 | 32 | — | — | 51 | 17 |
| 2 | AgCl | 27.0 | 620 | 35 | 46 | — | 1 | 30 | 23 |

EXAMPLE V

DEHYDROGENATION OF CIS-2-PENTENE - NO DILUENT (LHSV OF OLEFIN = 1-1.5)

| Run | Additive | % Additive | °C. Temp. | % Conv. | C$_4$ + less | Methyl Butene | Isoprene | Piperylene | Residue |
|---|---|---|---|---|---|---|---|---|---|
| 1 | AgBr | 38.6 | 520 | 38 | 53 | 13 | 1 | 13 | 21 |
| 2 | AgCl | 27.0 | 520 | 26 | 9 | 19 | 1 | 9 | 61 |
| 3 | AgI | 31.6 | 520 | 17 | 19 | 9 | 2 | 35 | 35 |
| 4 | AgBr | 38.6 | 620 | 51 | 50 | 1 | 2 | 23 | 24 |
| 5 | AgCl | 27.0 | 625 | 41 | 43 | 7 | 2 | 29 | 19 |
| 6 | AgI | 31.6 | 625 | 61 | 40 | 4 | 2 | 19 | 35 |

EXAMPLE VI

DEHYDROGENATION OF CIS-2-PENTENE - NO DILUENT (LHSV OF OLEFIN = 1–1.5)
Effect of Additive Loading

| Run | Additive | % Additive | % Load | °C. Temp. | % Conv. | % Selectivity | | | | Residue |
|-----|----------|------------|--------|-----------|---------|---------------|---------------|-----------|----------|---------|
|     |          |            |        |           |         | $C_4$ + less  | Methyl Butene | Isoprene  | Piperylene |       |
| 1   | AgBr     | 38.6       | 10     | 520       | 38      | 53            | 13            | 1         | 13       | 21      |
| 2   | AgBr     | 38.6       | 20     | 550       | 34      | 32            | 17            | 3         | 20       | 27      |
| 3   | AgBr     | 38.6       | 10     | 625       | 28      | 21            | 21            | 1         | 19       | 39      |
| 4   | AgBr     | 38.6       | 20     | 620       | 51      | 50            | 1             | 2         | 23       | 24      |
| 5   | AgCl     | 27.0       | 10     | 525       | 20      | 20            | 33            | 6         | 3        | 37      |
| 6   | AgCl     | 27.0       | 20     | 520       | 26      | 9             | 19            | 1         | 9        | 61      |
| 7   | AgCl     | 27.0       | 10     | 625       | 46      | 43            | 3             | 1         | 18       | 35      |
| 8   | AgCl     | 27.0       | 20     | 625       | 41      | 43            | 7             | 2         | 29       | 19      |
| 9   | AgI      | 31.6       | 10     | 520       | 28      | 47            | 6             | 1         | 27       | 20      |
| 10  | AgI      | 31.6       | 20     | 520       | 17      | 19            | 9             | 2         | 35       | 35      |
| 11  | AgI      | 31.6       | 10     | 625       | 17      | 16            | 20            | 2         | 25       | 37      |
| 12  | AgI      | 31.6       | 20     | 625       | 61      | 40            | 4             | 2         | 19       | 35      |

While certain representative embodiments and details have been shown for the purpose of illustrating the invention, it will be apparent to those skilled in this art that various changes and modifications may be made therein without departing from the spirit or scope of the invention.

What is claimed is:

1. A process for the dehydrogenation of monoolefins to diolefins which consists essentially of bringing said monoolefins into contact with a catalyst consisting essentially of at least one salt selected from the group consisting of silver chloride, silver iodide, silver fluoride, silver bromide, cadmium chloride, cadmium iodide, cadmium fluoride, cadmium bromide and copper ferricyanide deposited on an alumina support.

2. A process according to claim 1 in which a temperature of from about 375°C. to 725°C. is employed.

3. A process according to claim 1 wherein the monoolefins are either straight or branched chain and contain from 4 to 8 carbon atoms.

4. A process according to claim 1 wherein the monoolefins are selected from the group consisting of cis-2-butene, cis-2-pentene, 3-methyl-2-pentene, 1-butene, 1-pentene, 2-methyl-2-butene, 2,3-dimethyl-1-butene, 2,3-dimethyl-2-butene, 2-ethyl-1-butene, and 2-methyl-1-butene.

5. A process according to claim 4 in which the catalyst contains from about ten percent to about 40 percent by weight of the salt or mixtures thereof.

6. A process according to claim 5 in which the liquid hourly space velocity (LHSV) ranges from about 0.5 to about 2.0.

7. A process according to claim 1 wherein the catalyst contains from about one percent to about 40 percent by weight of the salt or mixtures thereof.

8. A process according to claim 1 wherein liquid hourly space velocity (LHSV) ranges from 0.1 to about 10.0.

* * * * *